R. H. BLAIR, Sr.
LANTERN BRACKET.
APPLICATION FILED OCT. 18, 1910.
982,762.
Patented Jan. 24, 1911.
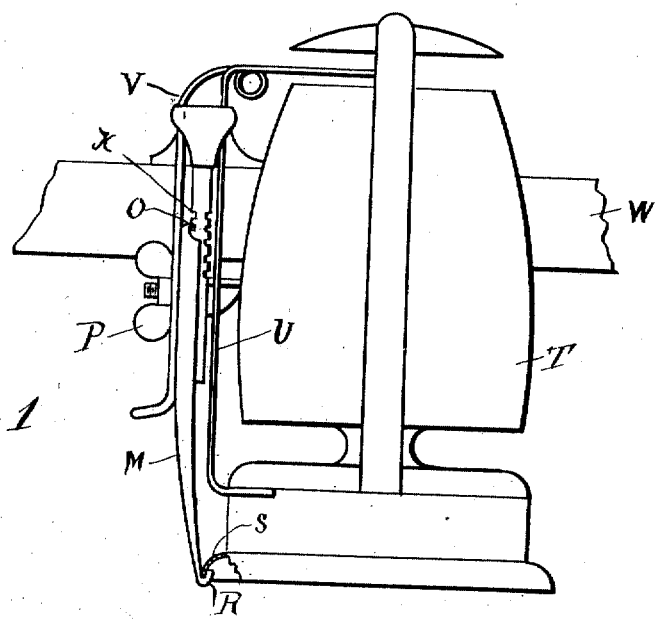
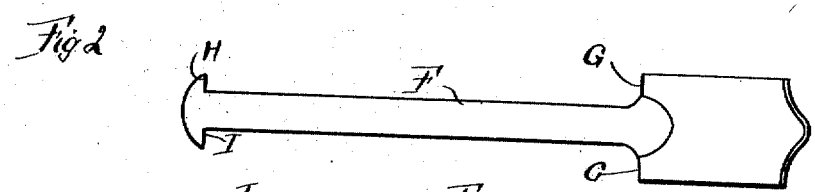
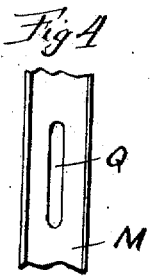
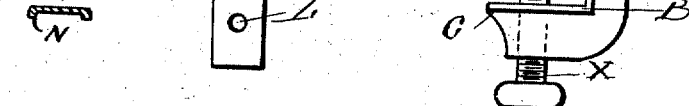
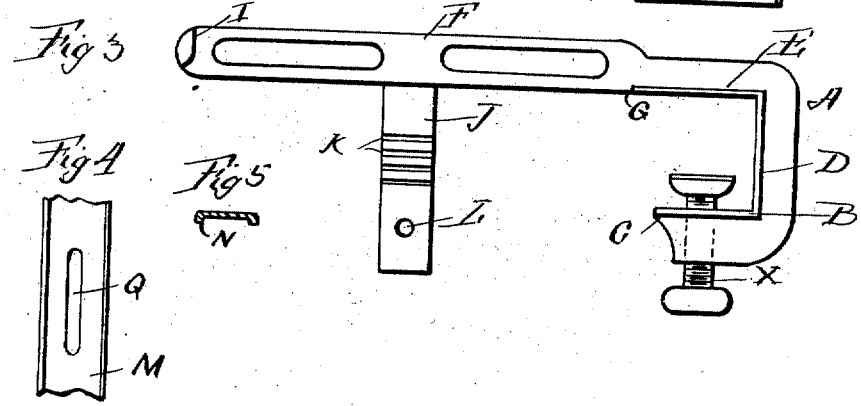
Witnesses
Francis A'cock
M P Williamson
Inventor
Robert H. Blair Sr.
By H H Williamson
Attorney

UNITED STATES PATENT OFFICE.

ROBERT H. BLAIR, SR., OF MEDIA, PENNSYLVANIA, ASSIGNOR TO THEODORE RICHARDSON, OF MEDIA, PENNSYLVANIA.

LANTERN-BRACKET.

982,762.

Specification of Letters Patent.

Patented Jan. 24, 1911.

Application filed October 18, 1910. Serial No. 587,753.

*To all whom it may concern:*

Be it known that I, ROBERT H. BLAIR, Sr., a citizen of the United States, residing at Media, in the county of Delaware and State of Pennsylvania, have invented a certain new and useful Improvement in Lantern-Brackets, of which the following is a specification.

My invention relates to a new and useful improvement in lantern brackets, and has for its object to construct a device of this character, which may be fastened to either the right or left shaft of a vehicle, for holding the ordinary wagon lantern so that the rays of light will be thrown upon the road in front of the horse, thereby overcoming the possibility of any obstacle shutting off the light and preventing it from being seen by the persons in the vehicle coming in the opposite direction.

A lantern when carried upon the dash board of a vehicle, throws the rays of light upon the horse, thereby causing the horse to throw a large shadow upon the road, obstructing said road from the view of the driver, while at the same time the horse's head prevents the light from being seen by any one driving toward you. Then again, if the lantern is fastened beside the driver's seat or within the vehicle, it prevents the driver seeing persons or other vehicles in the dark portions of the road, often causing accidents with loss of life and property. By the use of my invention I overcome the disagreeable features of the lantern, as said lantern being considerable distance from the driver, the reflector will reflect the light from shining in the driver's face and permit him to see a considerable distance before him, or any object upon which the rays of light may fall. A light carried in this manner upon a vehicle may be seen by a person coming in the opposite direction until said person is within a few feet of the vehicle carrying the light, thus overcoming the possibility of dangerous accidents.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is an end view of my improvement in lantern brackets, showing it attached to a vehicle shaft and having a lantern mounted thereon; a portion of said lantern being broken away to clearly show the construction of the device. Fig. 2, a plan view of the bracket. Fig. 3, a side elevation thereof; the adjusting member being removed. Fig. 4, is a face view of the adjusting member, and Fig. 5, a horizontal sectional view thereof, showing the side flanges.

In carrying out my invention as here embodied, A represents the bracket comprising a casting formed to produce a socket B, having a bottom wall and an end wall and a top wall, C, D, and E respectively. From the top wall E extends an arm F, of less width than the walls of the socket, thus providing a shoulder G at both sides of said arm. The outer end of said arm is provided with a lug H at each side thereof, producing a shoulder I at both sides of the arm.

Depending from a central point of the arm F is a leg J, having grooves or corrugations K upon each side thereof, and provided with a screw receiving opening L within its lower end, for a purpose to be hereinafter described.

M denotes the adjusting member which is also preferably formed from a casting, having flanges N formed with its sides, adapted to rest upon an edge of the leg J. The upper end of said adjusting member is provided with a lip O which engages one of the grooves K, and when the correct adjustment has been made, the thumb screw P which passes through a slot Q in the adjusting member and into the leg J, will be tightened to hold the member in its correct position. The lower end of the adjusting member is provided with a hook R which engages a flange S of the body of the lantern T. The lantern here shown being one of those ordinarily used with vehicles, having a reflector U to which is attached the attaching spring V.

When the lantern is in place upon the back of the bracket, the reflector U rests against one side of the arm F between the shoulders G and I, while the holding spring V engages the opposite side of the arm and rests between the shoulders G and I upon that side. When the bracket is in use the socket B engages one of the shafts W, and the back wall D rests against the inner surface of the shaft. In order to prevent said bracket from sliding from the shaft, I use a threaded set bolt X, which is threaded through the bottom wall C of the socket and engages the under surface of the shaft. In practice the bracket is attached to a vehicle shaft, preferably at the squared portion thereof, then by placing the lantern upon the arm F the adjusting member M may be moved vertically until the hook R engages the flange S of the lantern body. The bracket constructed along these lines is very strong and durable and can be made light or heavy, depending upon the use to which it is put, and when the lantern is placed thereon it will be sufficiently secure to prevent the breaking of the parts and also keep it from sliding or falling off.

Of course I do not wish to be limited to the exact details of construction here shown as these may be varied within the limits of the appended claims without departing from the spirit of my invention.

Having thus fully described my invention, what I claim as new and useful, is—

1. As a new article of manufacture; a lantern bracket comprising a socket, having an arm extending therefrom, said arm being of less width than the socket, thus producing a shoulder on each side of the arm, a lug formed with each side of the arm at its outer end, thus producing a shoulder upon each side of the arm in proximity to its outer end, a depending leg formed integral with the arm and an adjusting member mounted upon the leg.

2. As a new article of manufacture; a lantern bracket comprising a socket, having an arm extending therefrom, said arm being of less width than the socket, thus producing a shoulder on each side of the arm, a lug formed with each side of the arm at its outer end, thus producing a shoulder upon each side of the arm in proximity to its outer end, an integral depending leg formed with the arm at its central point, said leg having corrugations therein, and an adjusting member having a lip mounted upon the leg, said lip engaging the corrugations.

3. As a new and useful article of manufacture; a lantern bracket comprising a socket, having an arm extending therefrom, said arm being of less width than the socket, thus producing a shoulder on each side of the arm a lug formed with each side of the arm at its outer end, thus producing a shoulder upon each side of the arm in proximity to its outer end, an integral depending leg formed with the arm at its central point, said leg having corrugations therein, an adjusting member having flanges formed therewith, adapted to rest upon an edge of the leg, a lip formed with the upper end of the adjusting member for engagement with the corrugations, a hook formed at the lower end of the adjusting member and a set screw extending through the adjusting member into the leg.

4. In a lantern bracket a socket comprising a lower wall, an end wall and a top wall, an arm formed with the top wall of said socket, said arm being of less width than the socket, thus producing a shoulder on each side of the arm, a lug formed with each side of the outer end of the arm for producing shoulders on both sides of the outer end of the arm, a leg formed integrally from the arm and depending from the central portion thereof, said leg having horizontal grooves and a screw receiving opening, a bolt threaded through the lower wall of the socket, an adjusting member having a longitudinal slot therein, flanges formed at both sides of said adjusting member, a lip formed at the upper end of said member for engagement with the horizontal grooves, a hook formed at the lower end of the adjusting member and a set screw passing through the slot in said member and threaded into the screw receiving opening for holding the adjusting member in position.

5. In a lantern bracket a socket for engagement with the shaft of the vehicle, an arm carried by said socket; a depending leg formed with said arm and an adjusting member adjustably secured to the leg, said adjusting member adapted to engage the body of a lantern when the holding spring is placed over the arm.

In testimony whereof, I have hereunto affixed my signature in the presence of two subscribing witnesses.

ROBERT H. BLAIR, Sr.

Witnesses:
 CLARENCE F. WELCH,
 WILLIAM W. BALL.